(12) United States Patent  
Hwang et al.

(10) Patent No.: US 8,037,214 B2
(45) Date of Patent: Oct. 11, 2011

(54) METHOD AND APPARATUS FOR CONTROLLING DIRECT MEMORY ACCESS

(75) Inventors: In Ki Hwang, Daejeon (KR); Woo Sug Jung, Daejeon (KR); Do Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 245 days.

(21) Appl. No.: 11/932,718

(22) Filed: Oct. 31, 2007

(65) Prior Publication Data

US 2008/0133793 A1 Jun. 5, 2008

(30) Foreign Application Priority Data

Dec. 1, 2006 (KR) .................. 10-2006-0120371
Jul. 4, 2007 (KR) .................. 10-2007-0067264

(51) Int. Cl.
*G06F 13/28* (2006.01)
*H04L 12/56* (2006.01)
(52) U.S. Cl. .................. 710/22; 370/395.21
(58) Field of Classification Search .......... 710/22; 370/395.21
See application file for complete search history.

(56) References Cited

U.S. PATENT DOCUMENTS

2003/0099243 A1* 5/2003 Oh et al. .................. 370/395.21
2003/0188007 A1* 10/2003 Unger .......................... 709/232

FOREIGN PATENT DOCUMENTS

| EP | 1271329 | 1/2003 |
| JP | 6-161500 | 6/1994 |
| JP | 10133997 | 5/1998 |
| JP | 2000-330929 | 11/2000 |
| JP | 2001-350713 | 12/2001 |
| KR | 2002-0073784 | 9/2002 |

* cited by examiner

*Primary Examiner* — Henry Tsai
*Assistant Examiner* — Hyun Nam
(74) *Attorney, Agent, or Firm* — Rabin & Berdo, P.C.

(57) ABSTRACT

Provided are a method and apparatus for controlling direct memory access. In the method, data to be transmitted are read and stored in response to a direct memory access controller (DMAC) operation request, and a portion of the data corresponding to an initial burst size is first transmitted to a data destination. After resetting a burst size according to a state of the data destination, another portion of the data corresponding to the reset burst size is second-transmitted to the data destination. If all the data are not transmitted through the first-transmission and the second-transmission, the second-transmission is repeated until all the data are transmitted. If all the data are transmitted through the first-transmission and the second-transmission, an interrupt signal is generated. Therefore, interrupt signals can be less generated, and thus the processor can access an external memory less frequently, thereby increasing system performance.

14 Claims, 5 Drawing Sheets

METHOD AND APPARATUS FOR CONTROLLING DIRECT MEMORY ACCESS

CROSS-REFERENCE TO RELATED APPLICATIONS

The present application is based on, and claims priorities from the Korean Patent Application Number 10-2006-0120371 filed on Dec. 1, 2006 and the Korean Patent Application Number 10-2007-0067264 filed on Jul. 4, 2007, the disclosure of which is hereby incorporated by reference herein in its entirety

BACKGROUND OF THE INVENTION

1. Field of the Invention

The present invention relates to a direct memory access controller (DMAC), and more particularly, to a method and apparatus for controlling direct memory access to prevent a decrease in system performance by minimizing generation of interrupts.

This work was supported by the IT R&D program of MIC/IITA [2005-S-100-02, Development of Multi-codec and Its Control Technology Providing Variable Bandwidth Scalability]

2. Description of the Related Art

In general, voice data are processed on a ten to twenty millisecond basis in a voice over Internet protocol (VoIP) phone system. For this, a voice output unit of the VoIP phone system can include a high-capacity output storage medium such as a high-capacity first input first output (FIFO) for outputting voice data on a ten to twenty millisecond basis at a time. However, in this case, the manufacturing costs and size of the VoIP phone system increase due to the high-capacity output storage medium.

For this reason, VoIP phone systems use a low-capacity output storage medium and output voice data discretely.

Meanwhile, a voice output unit of a VoIP phone system receives voice data using a direct memory access controller (DMAC) in order to minimize intervention of a processor.

In response to a DMAC operation request sent from the voice output unit, the DMAC reads a portion of voice data corresponding to a burst size of an output storage medium from an external memory and transmits the read portion of the voice data to the voice output unit. Then, the DMAC generates an interrupt signal to inform a processor that the portion of the voice data is completely transmitted.

When the processor receives the interrupt signal, the processor suspends its current operation and stores information about the suspended operation in a memory such as the external memory. Then, the processor processes the interrupt signal prior to others and reads the information about the suspended operation from the external memory to resume the suspended operation.

However, it takes much more time for the processor to access the external memory for performing the above-described operation as compared with the time required for the processor to perform its internal operation. Therefore, system performance steeply decreases as the processor accesses the external memory more frequently for processing interrupt signals.

In other words, the system performance decreases much more when the DMAC generates more interrupt signals.

SUMMARY OF THE INVENTION

An aspect of the present invention provides a method and apparatus for controlling direct memory access in a voice over Internet protocol (VoIP) phone system to prevent the VoIP phone system from decreasing in performance by minimizing generation of interrupt signals even when a voice output unit has a low-capacity output storage medium.

According to an aspect of the present invention, there is provided a method of controlling direct memory access, the method including: reading and storing data to be transmitted in response to a direct memory access controller (DMAC) operation request; first-transmitting a portion of the data corresponding to an initial burst size to a data destination; after resetting a burst size according to a state of the data destination, second-transmitting another portion of the data corresponding to the reset burst size to the data destination; if all the data are not transmitted through the first-transmitting and the second-transmitting, repeating the second-transmitting until all the data are transmitted; and if all the data are transmitted through the first-transmitting and the second-transmitting, generating an interrupt signal.

The reading and storing of the data may include: obtaining bus mastership in response to the DMAC operation request from the data destination; enabling a channel through which a DMAC operation is requested and checking a data source, the data destination, a total amount of the data to be transmitted, and the initial burst size; and after reading the data by accessing the data source, storing the read data in an internal storage medium. The second-transmitting may include: checking the state of the data destination each time a portion of the data is transmitted through the first-transmitting or the second-transmitting; resetting the burst size according to the state of the data destination; and reading another portion of the data corresponding to the reset burst size and transmitting the read portion of the data to the data destination. The repeating of the second-transmitting and the generating of the interrupt signal may include: each time a portion of the data is transmitted through the first-transmitting or the second-transmitting, calculating the amount of remaining data by subtracting the amount of transmitted data from the total amount of the data; if the amount of remaining data is not zero, repeating the second-transmitting until the amount of remaining data become zero; and if the amount of remaining data is zero, generating the interrupt signal.

According to another aspect of the present invention, there is provided an apparatus for controlling direct memory access, the apparatus including: a burst size controller providing an initial burst size when a portion of data is first transmitted to a data destination in a DMAC operation, and a reset burst size determined according to a state of the data destination when another portion of the data is transmitted in the DMAC operation; a data output unit storing data received from a data source and performing a transmission operation for successively transmitting the data to the data destination in units of burst sizes provided by the burst size controller until all the data are transmitted to the data destination; an operation control unit controlling the data output unit to store the data received from the data source in response to a DMAC operation request and controlling the transmission operation of the data output unit, the operation control unit generating an interrupt signal when the transmission operation of the data output unit is completed; and a bus interface functioning as a path to the data source and the data destination.

The operation control unit may include: a channel controller enabling a channel through a DMAC operation request is detected; an address generator generating a source address and a destination address by checking the data source and the data destination through the channel; an interface signal controller encoding a control signal to be transmitted through the bus interface or decoding a signal input through the bus interface according to a bus protocol; a DMAC state controller monitors an operational state of the apparatus and determining the operational state of the apparatus according to the monitoring result; a control signal controller storing and updating information necessary for operation of the apparatus and generating the control signal using the information; and an interrupt controller generating the interrupt signal after the data output unit performs the transmission operation until all the data are transmitted to the data destination.

The interrupt controller may include: a transmission completion amount register storing a burst size provided by the burst size controller as the amount of data transmitted to the data destination; a transmission remaining amount calculator calculating the amount of remaining data by subtracting the amount of transmitted data from a total amount of the data; a transmission remaining amount register storing the amount of remaining data calculated by the transmission remaining amount calculator; and interrupt generation determiner generating interrupt signal generation information when the amount of remaining data is zero and interrupt signal non-generation information when the amount of remaining data is not zero.

The burst size controller may include: an initial value register storing the initial burst size; a reset value register storing an available storage size of the data destination; and a burst size selector providing the initial burst size when a portion of data is first transmitted to the data destination in the DMAC operation and the available storage size of the data destination as the reset burst size when another portion of the data is transmitted in the DMAC operation. The data output unit may include: a first input first output (FIFO) storing the data received from the data source; a FIFO controller generating pointer information and a synchronization signal for the FIFO and controlling the FIFO to store the data transmitted from the data source in response to a DMAC operation request, the FIFO controller successively outputting the data stored in the FIFO in units of burst sizes provided by the burst size controller until all the data are transmitted to the data destination.

According to another aspect of the present invention, there is provided a voice over Internet protocol (VoIP) phone system including: a voice output unit including an output storage medium, the voice output unit requesting a DMAC operation for receiving voice data and outputting the received voice data when the output storage medium is ready for outputting voice data; a memory storing the voice data; a direct memory access control apparatus storing the voice data received from the memory in response to the DMAC operation request of the voice output unit, successively outputting the voice data to the voice output unit in units of burst sizes until all the voice data are transmitted to the voice output unit while varying the burst size according to a state of the output storage medium of the voice output unit, and generating an interrupt signal when all the voice data are transmitted to the voice output unit; and a processor processing the interrupt signal generated by the direct memory access control apparatus prior to others according to an interrupt handling routine to clear the interrupt signal.

The direct memory access control apparatus may include: a burst size controller providing an initial burst size when a portion of the voice data is first transmitted to the voice output unit in a DMAC operation, and a reset burst size determined according to the state of the output storage medium of the voice output unit when another portion of the voice data is transmitted to the voice output unit in the DMAC operation; a data output unit storing the voice data received from the memory, the data output unit performing a transmission operation for successively transmitting the voice data to the voice output unit in units of burst sizes provided by the burst size controller until all the voice data are transmitted to the voice output unit; an operation control unit controlling the data output unit to store the voice data received from the memory in response to the DMAC operation request and controlling the transmission operation of the data output unit, the operation control unit generating an interrupt signal when the transmission operation of the data output unit is completed; and a bus interface functioning as a path to the memory and the voice output unit.

According to the present invention, the direct memory access control apparatus can generate much fewer interrupt signals regardless of the capacity of the output storage medium of the voice output unit. Therefore, the processor can access an external memory much less frequently for processing the interrupt signals, thereby increasing system performance.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
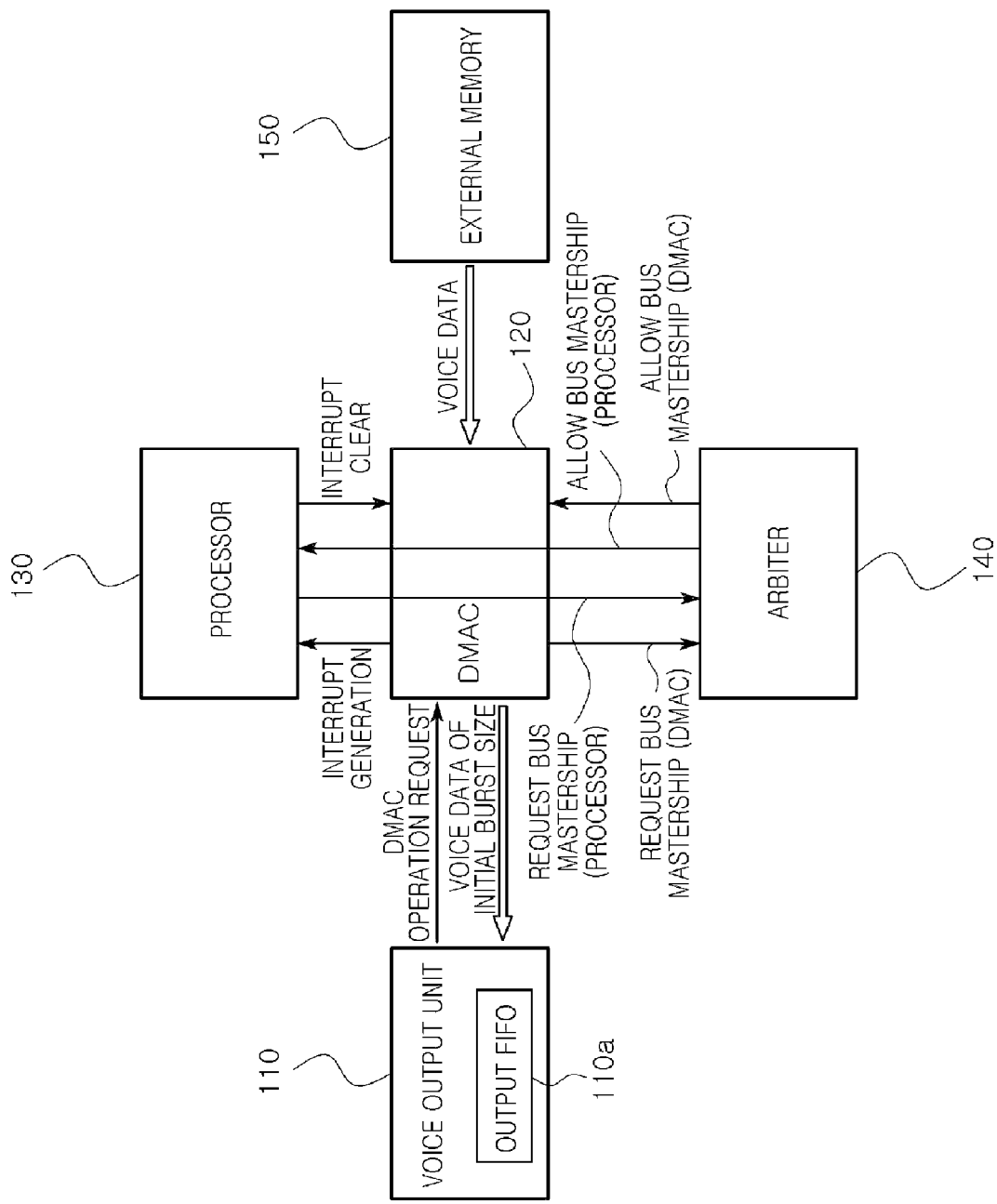
FIG. 1 is a view illustrating a voice over Internet protocol (VoIP) phone system according to the related art.

Exemplary embodiments of the present invention will now be described in detail with reference to the accompanying drawings. In the following description, well-known functions or constructions are not described in detail since they would obscure the invention in unnecessary detail.

In every possible case, like reference numerals are used for referring to the same or similar elements in the description and drawings.

Prior to describing the present invention, a conventional method of outputting voice data in a voice over Internet protocol (VoIP) phone system will be first described for the purpose of providing further understanding of the present invention.

FIG. 1 is a view illustrating a conventional VoIP phone system according.

Referring to FIG. 1, the VoIP phone system includes a voice output unit 110, a direct memory access controller (DMAC) 120, a processor 130, an arbiter 140, and an external memory 150. The voice output unit 110 includes a low-capacity output first input first output (FIFO) 110a and outputs voice data to an audio device (not shown) in units of initial burst sizes of the output FIFO 110a. The DMAC 120 transmits voice data stored in the external memory 150 to the voice output unit 110 in units of initial burst sizes of the output FIFO 110*a* in response to a request from the voice output unit 110. When the voice data is completely transmitted, the DMAC 120 generates an interrupt signal. The processor 130 processes the interrupt signal generated by the DMAC 120 prior to others. The arbiter 140 arbitrates bus mastership between the DMAC 120 and the processor 130. The external memory 150 stores voice data to be transmitted to the voice output unit 110.

Figure 2:
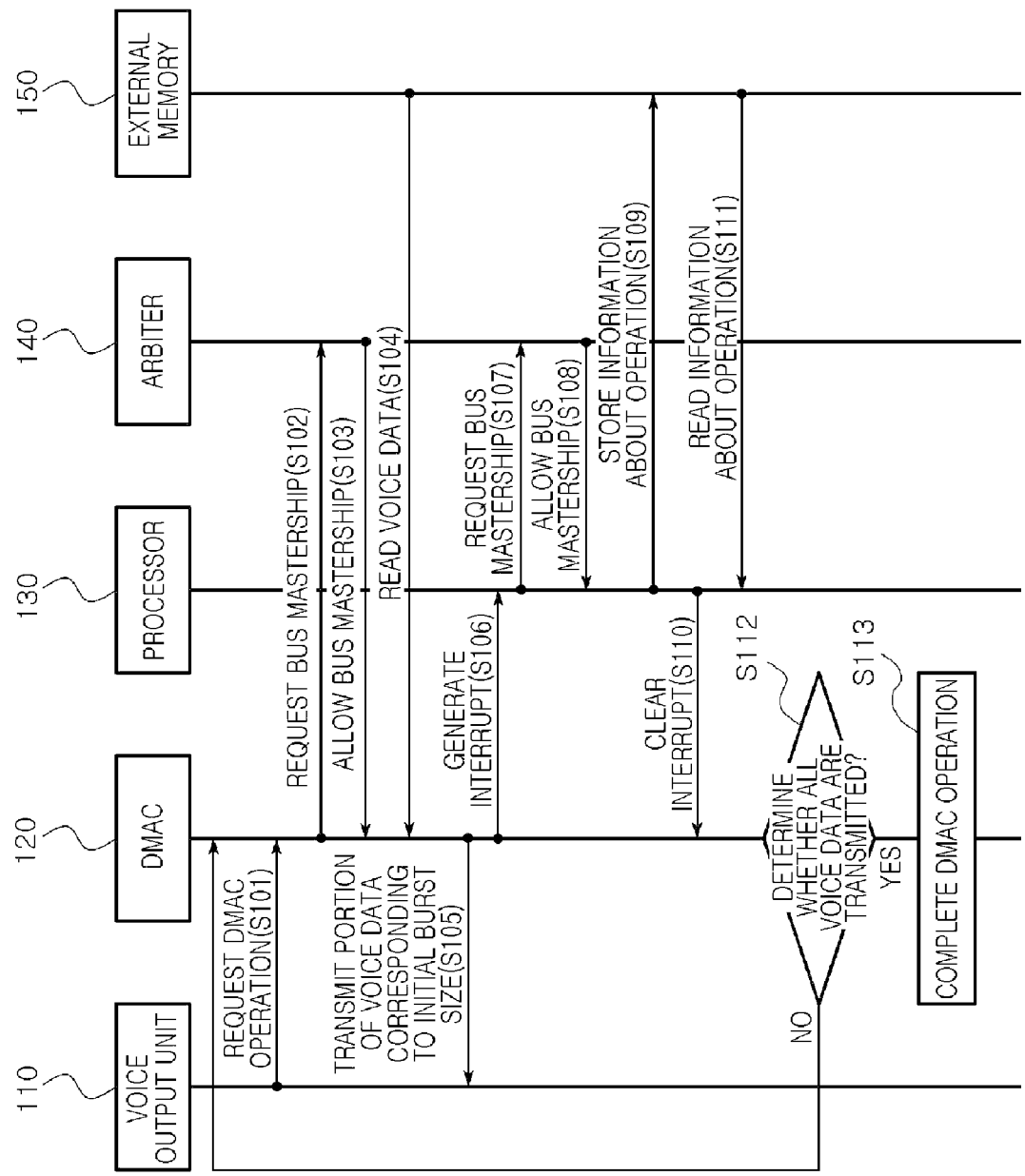
FIG. 2 is a flowchart for explaining a method of outputting voice data in a VoIP system of FIG. 1.

FIG. 2 is a flowchart for explaining a method of outputting voice data in the VoIP system of FIG. 1.

In operation S101, when the voice output unit 110 is ready to output voice data, the voice output unit 110 requests the DMAC 120 to operate. In operation S102, the DMAC 120 requests the arbiter 140 to allow bus mastership in response to the request of the voice output unit 110.

In operation S103, the arbiter 140 transfers the bus mastership to the DMAC 120 if bus states are suitable for the DMAC 120 to use.

After receiving the bus mastership, in operation S104, the DMAC 120 establishes a DMAC channel; checks a data source, a data destination, the total amount of voice data to be output, and an initial burst size; accesses the data source for receiving the total amount of voice data to be output; and stores the received voice data to its storage medium.

Here, the data source is the external memory 150, and the data destination is the output FIFO 110*a* of the voice output unit 110.

In operation S105, the DMAC 120 reads a portion of the voice data corresponding to the initial burst size from its storage medium and sends the read portion of the voice data to the voice output unit 110. When the portion of the voice data is input to the output FIFO 110*a*, the voice output unit 110 outputs the portion of the voice data to an external audio device according to a voice data transmission protocol.

In operation S106, when the voice output unit 110 outputs the portion of the voice data completely, the DMAC 120 generates an interrupt signal to inform the processor 130 of the completion of the voice data transmission. At the same time, the DMAC 120 calculates the amount of remaining voice data by subtracting the initial burst size from the total amount of the voice data. Then, the DMAC 120 stays in standby mode for the next DMAC operation request.

Meanwhile, the processor 130 suspends its current operation in response to the interrupt signal received from the DMAC 120 and receives the bus mastership from the arbiter 140 according to an interrupt handling routine in operations S107 and S108. In operation S109, the processor 130 stores information about the suspended operation in the external memory 150.

In operation S110, the processor 130 processes the interrupt signal to clear the interrupt signal. In operation S111, the processor 130 reads the information about the suspended operation from the external memory 150 and stores the read data in an internal cache memory to resume the suspended operation.

Operations S101 through S111 are repeated until it is determined that the total amount of the voice data is output through the voice output unit 110 in operation S112. When the amount of remaining voice data in the DMAC 120 is zero, the process ends in operation S113.

Since the DMAC 120 transmits a portion of voice data corresponding to an initial burst size of the output FIFO 110*a* through a single DMAC operation, the DMAC 120 may have to generate many interrupt signals when the capacity of the output FIFO 110*a* is low. In this case, the processor 130 has to process many interrupt signals. This decreases the performance of the VoIP phone system.

To obviate these problems, the present invention provides an apparatus and method for controlling direct memory access to prevent a decrease in system performance by maintaining generation of interrupts at a minimal level regardless of the capacity of a FIFO.

Figure 3:
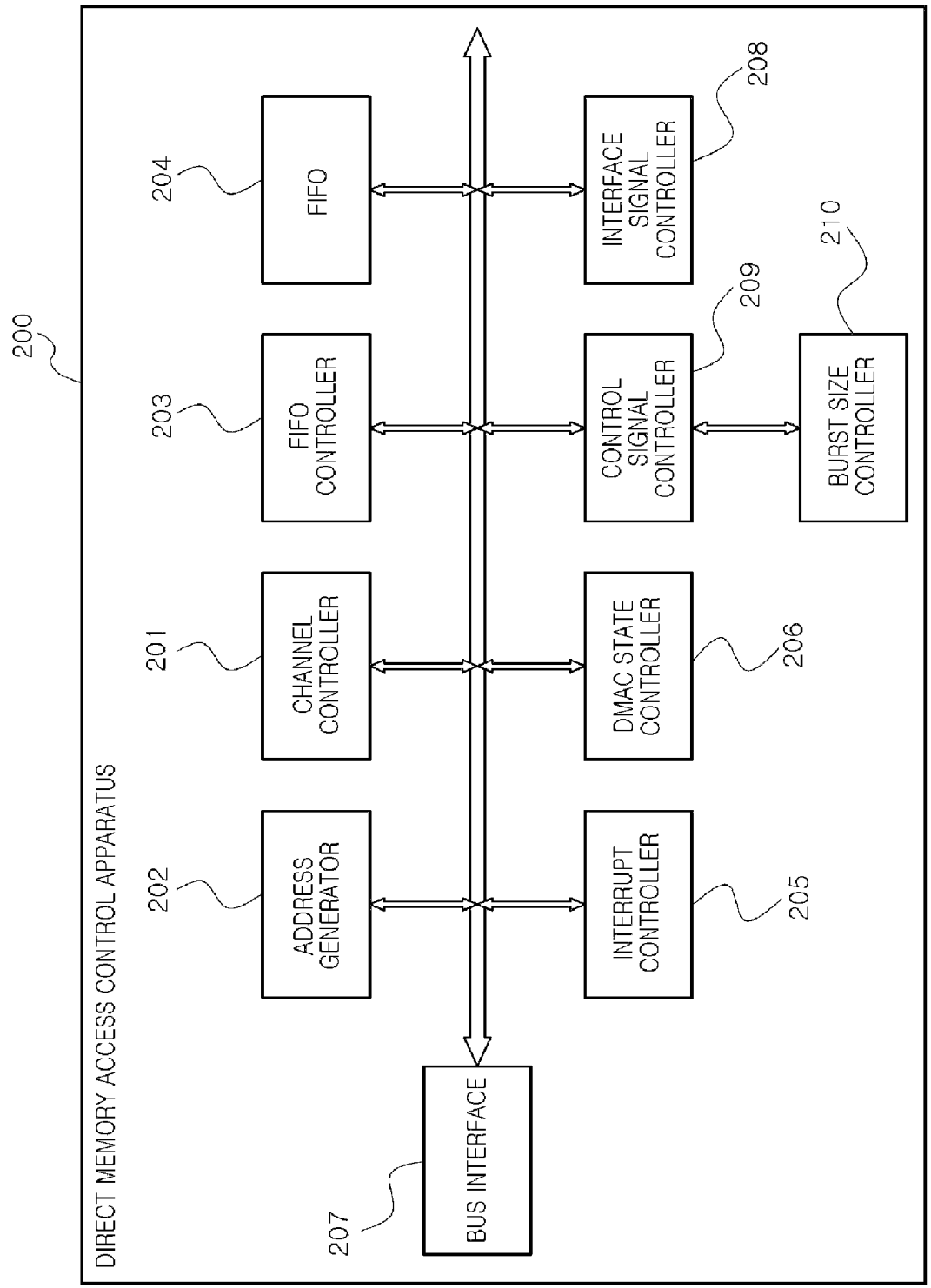
FIG. 3 is a view illustrating an apparatus for controlling direct memory access according to an embodiment of the present invention.

FIG. 3 is a view illustrating an apparatus 200 for controlling direct memory access according to an embodiment of the present invention. The direct memory access control apparatus 200 corresponds to the conventional DMAC 120 illustrated in FIGS. 1 and 2.

Referring to FIG. 3, the direct memory access control apparatus 200 of the current embodiment includes a channel controller 201, an address generator 202, a FIFO controller 203, a FIFO 204, an interrupt controller 205, a DMAC state controller 206, a bus interface 207, an interface signal controller 208, a control signal controller 209, and a burst size controller 210. Here, the channel controller 201, the address generator 202, the interrupt controller 205, the DMAC state controller 206, the interface signal controller 208, the control signal controller 209 can be grouped into an operation control unit; and the FIFO controller 203 and the FIFO 204 can be grouped into a data output unit.

Each element of the direct memory access control apparatus 200 will now be described in detail.

When the voice output unit 110 requests a DMAC operation, the channel controller 201 searches channels of the direct memory access control apparatus 200 for a channel through with the DMAC operation request of the voice output unit 110 is input. Then, the channel controller 201 sets the searched channel to be enable.

The address generator 202 finds a data source and a data destination with respect to the channel enabled by the channel controller 201 to generate a source address and a destination address.

The FIFO controller 203 generates pointer information and a synchronization signal for voice data input/output of the FIFO 204. Further, in DMAC operation, the FIFO controller 203 controls the FIFO 204 to store voice data transmitted from the external memory 150 and reads the voice data stored in the FIFO 204 in units of burst sizes determined by the burst size controller 210 to successively output the read voice data to the voice output unit 110.

The FIFO 204 sequentially receives and outputs voice data under the control of the FIFO controller 203.

The interrupt controller 205 generates an interrupt signal and transmits the interrupt signal to the processor 130 to inform the processor 130 of completion of voice data transmission when the DMAC state controller 206 reports that all voice data stored in the FIFO 204 are output to the voice output unit 110.

The DMAC state controller 206 monitors operational states of all elements 201 through 210 of the direct memory access control apparatus 200 and channel states of the direct memory access control apparatus 200. The DMAC state controller 206 determines the operational state of the direct memory access control apparatus 200 according to the monitoring result.

The bus interface 207 is a path connected to the voice output unit 110, the processor 130, and the external memory 150.

The interface signal controller 208 encodes a control signal of the control signal controller 209 according to a bus protocol to convert the control signal into an interface signal that can be recognized by the bus interface 207. Further, the interface signal controller 208 decodes an interface signal transmitted from the bus interface 207 according to a bus protocol to obtain a control signal determining the next operation of the direct memory access control apparatus 200.

The control signal controller 209 stores and updates various information necessary for operation of the direct memory access control apparatus 200 and generates control signals recognizable by the elements 201 through 210 of the direct memory access control apparatus 200 using the stored information. For example, the control signal controller 209 generates and outputs a control signal for informing the channel controller 201 and the DMAC state controller 206 that the voice output unit 110 transmits a DMAC operation request signal, informing the burst size controller 210 that the voice output unit 110 transmits a signal containing information about an available storage size of the output FIFO 110*a*, or informing the FIFO controller 203 of a burst size provided by the burst size controller 210.

The burst size controller 210 provides information about a preset initial burst size when voice data are first transmitted in response to a DMAC operation request of the voice output unit 110. Thereafter, each time transmission of voice data is completed, the burst size controller 210 recognizes an available storage size of the output FIFO 110*a* to reset a burst size and provide the reset burst size.

Figure 4:
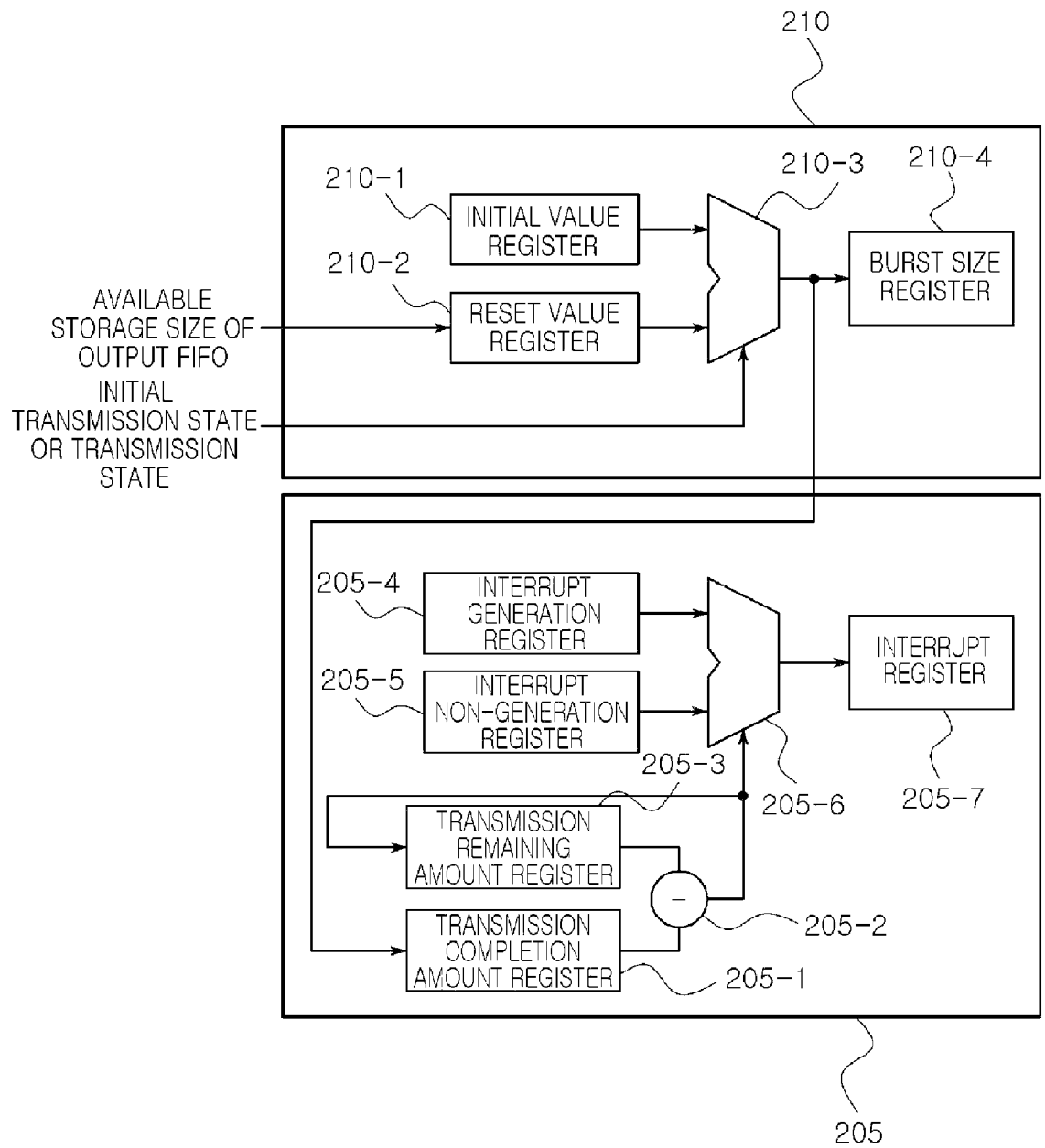
FIG. 4 is detailed view illustrating a burst size controller and an interrupt controller of the direct memory access control apparatus of FIG. 3, according to an embodiment of the present invention.

FIG. 4 is detailed view illustrating the burst size controller 210 and the interrupt controller 205 of the direct memory access control apparatus 200 of FIG. 3, according to an embodiment of the present invention.

Referring to FIG. 4, the burst size controller 210 includes an initial value register 210-1, a reset value register 210-2, a burst size selector 210-3, and a burst size register 210-4. The interrupt controller 205 includes a transmission completion amount register 205-1, a transmission remaining amount calculator 205-2, a transmission remaining amount register 205-3, an interrupt generation register 205-4, an interrupt non-generation register 205-5, a interrupt generation determiner 205-6, and an interrupt register 205-7.

Each element will now be described in detail.

The initial value register 210-1 of the burst size controller 210 stores a preset initial burst size of the output FIFO 110*a*.

The reset value register 210-2 stores an available storage size of the output FIFO 110*a* provided by the voice output unit 110 each time transmission of voice data is completed.

The burst size selector 210-3 outputs the initial burst size when voice data is first transmitted. Otherwise, the burst size selector 210-3 outputs an available storage size of the output FIFO 110*a*. Here, it can be determined whether voice data are first transmitted from information about the operational state of the direct memory access control apparatus 200 provided by the DMAC state controller 206.

The burst size register 210-4 stores the size information output from the burst size selector 210-3 as a current burst size of the direct memory access control apparatus 200.

The transmission completion amount register 205-1 of the interrupt controller 205 stores the size information output from the burst size selector 210-3 as the amount of voice data transmitted to the voice output unit 110.

The transmission remaining amount calculator 205-2 calculates the amount of remaining voice data to be transmitted to the voice output unit 110 by subtracting the amount of transmitted voice data from the total amount of voice data.

The transmission remaining amount register 205-3 stores information about the amount of remaining voice data calculated by the transmission remaining amount calculator 205-2, and the information stored in the transmission remaining amount register 205-3 is updated each time the transmission remaining amount calculator 205-2 calculates the amount of remaining voice data.

The interrupt generation register 205-4 stores information about generation of an interrupt, and the interrupt non-generation register 205-5 stores information about non-generation of an interrupt.

When the amount of remaining voice data calculated by the transmission remaining amount calculator 205-2 is zero, the interrupt generation determiner 205-6 outputs interrupt generation information. Otherwise, the interrupt generation determiner 205-6 outputs interrupt non-generation information.

The interrupt register 205-7 stores the information output from the interrupt generation determiner 205-6.

When voice data are first transmitted in DMAC operation, the burst size controller 210 outputs the initial burst size stored in the initial value register 210-1 to allow the FIFO controller 203 to transmit an amount of voice data corresponding to the initial burst size to the voice output unit 110. The interrupt controller 205 calculates the amount of remaining voice data by subtracting the initial burst size from the total amount of voice data.

Here, if the amount of remaining voice data is zero, the interrupt controller 205 outputs interrupt generation information to inform the processor 130 that the total amount of voice data has been transmitted. If the amount of remaining voice data is not zero, the interrupt controller 205 outputs interrupt non-generation information to allow the direct memory access control apparatus 200 to continue the DMAC operation.

Then, the burst size controller 210 resets the burst size using the available storage size of the output FIFO 110*a* stored in the reset value register 210-2 to allow the FIFO controller 203 to transmit an amount of voice data corresponding to the reset burst size to the voice output unit 110. Then, the interrupt controller 205 re-calculates the amount of remaining voice data by subtracting the reset burst size from the previously calculated amount of remaining voice data.

The above-described operations are repeated until the amount of remaining voice data becomes zero, and when the amount of remaining voice data becomes zero, the interrupt controller 205 outputs interrupt generation information to inform the processor 130 that the total amount of voice data is transmitted.

Figure 5:
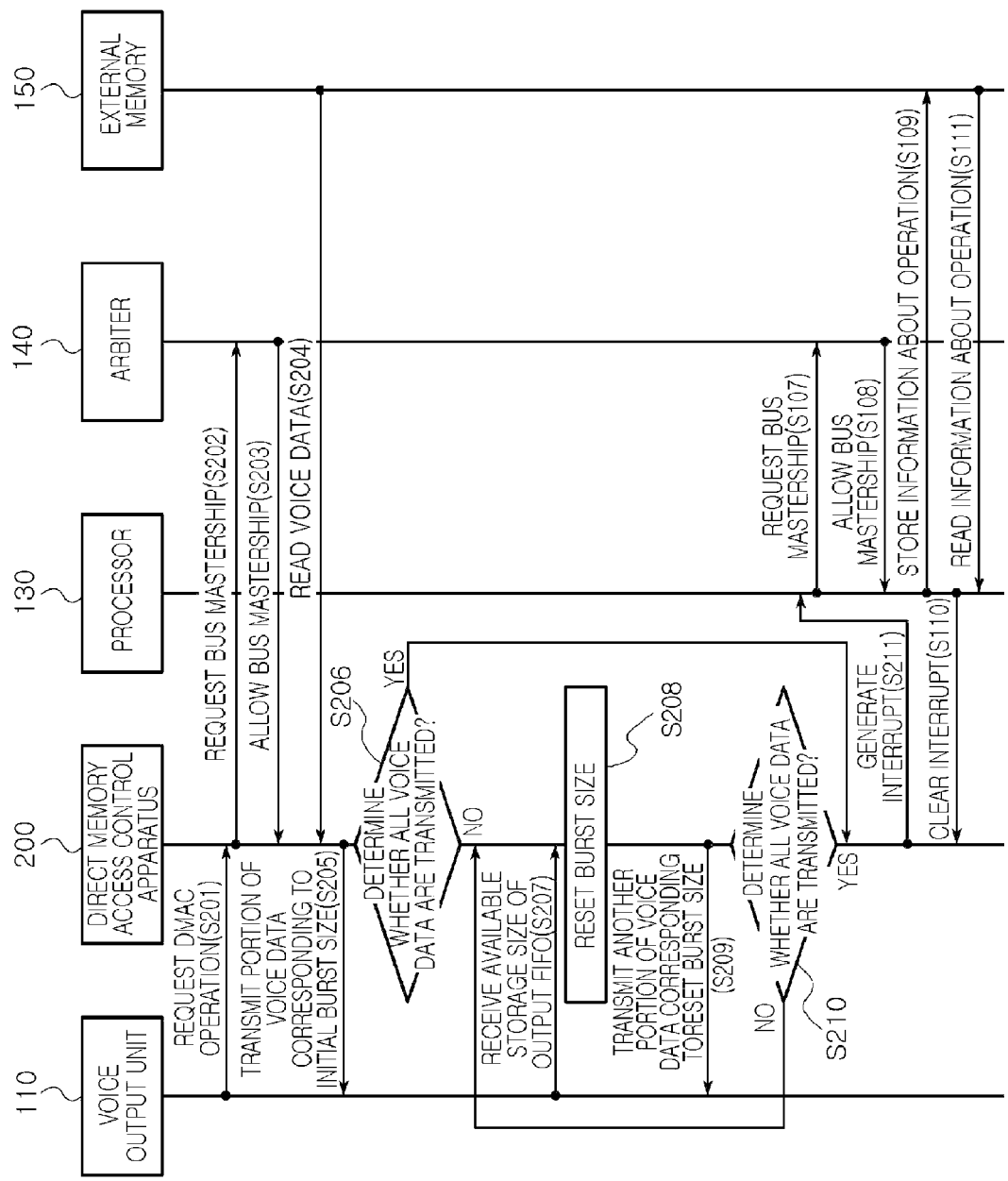
FIG. 5 is a flowchart for explaining a method of outputting data in a VoIP system using the direct memory access control apparatus according to an embodiment of the present invention.

FIG. 5 is a flowchart for explaining a method of outputting data in a VoIP system using the direct memory access control apparatus 200 according to an embodiment of the present invention.

In operation S201, when the voice output unit 110 is ready to output voice data, the voice output unit 110 generates a DMAC operation request signal. In operation S202, in response to the DMAC operation request signal, the direct memory access control apparatus 200 requests the arbiter 140 to allow bus mastership.

In operation S203, the arbiter 140 transfers the bus mastership to the direct memory access control apparatus 200 if bus states are suitable for the direct memory access control apparatus 200 to use.

After receiving the bus mastership, in operation S204, the DMAC 120 establishes a DMAC channel; checks a data source, a data destination, the total amount of voice data to be output, and an initial burst size; accesses the data source for receiving the total amount of voice data to be output; and stores the received voice data to its storage medium.

Here, as described above, the data source is the external memory 150, and the data destination is the output FIFO 110*a* of the voice output unit 110.

In operation S205, the DMAC 200 reads a portion of the voice data corresponding to the initial burst size from its storage medium and sends the read portion of the voice data to the voice output unit 110.

In operation S206, it is determined whether the total amount of voice data is transmitted to the voice output unit 110.

If the total amount of voice data is transmitted to the voice output unit 110, the procedure goes to operation S211 where the direct memory access control apparatus 200 generates an interrupt signal to inform the processor 130 that the total amount of voice data is transmitted to the voice output unit 110. If the total amount of voice data is not transmitted to the voice output unit 110, the direct memory access control apparatus 200 receives information about an available storage size of the output FIFO 110a from the voice output unit 110 in operation S207.

In operation S208, the direct memory access control apparatus 200 resets the burst size with the available storage size received in operation S207. In operation 209, the direct memory access control apparatus 200 reads a portion of the voice data corresponding to the reset burst size and transmit the read portion of the voice data to the voice output unit 110.

In operation S210, the direct memory access control apparatus 200 determines whether the total amount of the voice data is transmitted to the voice output unit 110. If the total amount of the voice data is not transmitted to the voice output unit 110, the direct memory access control apparatus 200 repeats operations S206 through S208 until the total amount of the voice data is transmitted to the voice output unit 110. If the total amount of the voice data is transmitted to the voice output unit 110, the direct memory access control apparatus 200 generates an interrupt signal to inform the processor 130 that the total amount of the voice data is completely transmitted in operation S211.

After receiving the interrupt signal, the processor 130 performed operations S107 through S111 for processing and clearing the interrupt signal prior to others, like the case of FIG. 2.

As described above, the direct memory access control apparatus 200 transmits voice data successively while changing the burst size according to the state of the output FIFO 110a of the voice output unit 110, and after the total amount of voice data is transmitted, the direct memory access control apparatus 200 generates an interrupt signal. Therefore, the interrupt signal is generated just one time regardless of the capacity of the output FIFO 110a of the voice output unit 110.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of controlling direct memory access, the method comprising:
    reading and storing data to be transmitted in response to a direct memory access controller (DMAC) operation request;
    first-transmitting a portion of the data corresponding to an initial burst size to a data destination;
    after resetting a burst size according to an available storage size of the data destination, second-transmitting another portion of the data corresponding to the reset burst size to the data destination;
    if all the data are not transmitted through the first-transmitting and the second-transmitting, repeating the second-transmitting until all the data are transmitted; and
    if all the data are transmitted through the first-transmitting and the second-transmitting, generating an interrupt signal,
    wherein the reading and storing of the data comprises:
        obtaining bus mastership in response to the DMAC operation request from the data destination;
        enabling a channel through which a DMAC operation is requested and checking a data source, the data destination, a total amount of the data to be transmitted, and the initial burst size; and
        after reading the data by accessing the data source, storing the read data in an internal storage medium,
    and the second-transmitting comprises:
        checking the state of the data destination each time a portion of the data is transmitted through the first-transmitting or the second-transmitting;
        resetting the burst size according to the state of the data destination; and
        reading another portion of the data corresponding to the reset burst size and transmitting the read portion of the data to the data destination.

2. The method of claim 1, wherein the reset burst size is equal to an available storage size of the data destination not used for storing data.

3. The method of claim 1, wherein the repeating of the second-transmitting and the generating of the interrupt signal comprise:
    each time a portion of the data is transmitted through the first-transmitting or the second-transmitting, calculating the amount of remaining data by subtracting the amount of transmitted data from the total amount of the data;
    if the amount of remaining data is not zero, repeating the second-transmitting until the amount of remaining data become zero; and
    if the amount of remaining data is zero, generating the interrupt signal.

4. An apparatus for controlling direct memory access, the apparatus comprising:
    a burst size control unit providing an initial burst size when a portion of data is first transmitted to a data destination in a direct memory access controller (DMAC) operation, and a reset burst size determined according to an available storage size of the data destination when another portion of the data is transmitted in the DMAC operation;
    a data output unit storing data received from a data source and performing a transmission operation for successively transmitting the data to the data destination in units of burst sizes provided by the burst size control unit until all the data are transmitted to the data destination;
    an operation control unit controlling the data output unit to store the data received from the data source in response to a DMAC operation request and controlling the transmission operation of the data output unit, the operation control unit generating an interrupt signal when the transmission operation of the data output unit is completed; and
    a bus interface functioning as a path to the data source and the data destination,
    wherein the operation control unit comprises:
        a channel controller detecting a channel requested a DMAC operation, and setting the detected channel to be enable;
        an address generator generating a source address and a destination address by checking the data source and the data destination in respect to the detected channel;

an interface signal controller encoding a control signal to be transmitted to the bus interface or decoding a signal input received from the bus interface according to a bus protocol;

a DMAC state controller determines the operational state of the apparatus;

a control signal controller storing and updating information necessary for operation of the apparatus and generating the control signal using the information; and an interrupt controller generating the interrupt signal after the data output unit performs the transmission operation until all the data are transmitted to the data destination.

5. The apparatus of claim 4, wherein the interrupt controller comprises:

a transmission completion amount register storing a burst size provided by the burst size control unit as the amount of data transmitted to the data destination;

a transmission remaining amount calculator calculating the amount of remaining data by subtracting the amount of transmitted data from a total amount of the data;

a transmission remaining amount register storing the amount of remaining data calculated by the transmission remaining amount calculator; and an interrupt generation determiner generating interrupt signal generation information when the amount of remaining data is zero and interrupt signal non-generation information when the amount of remaining data is not zero.

6. The apparatus of claim 4, wherein the burst size control unit comprises:

an initial value register storing the initial burst size;

a reset value register storing an available storage size of the data destination; and a burst size selector providing the initial burst size when a portion of data is first transmitted to the data destination in the DMAC operation and the available storage size of the data destination as the reset burst size when another portion of the data is transmitted in the DMAC operation.

7. The apparatus of claim 4, wherein the data output unit comprises:

a first input first output (FIFO) storing the data received from the data source;

a FIFO controller generating pointer information and a synchronization signal for the FIFO and controlling the FIFO to store the data transmitted from the data source in response to a DMAC operation request, the FIFO controller successively outputting the data stored in the FIFO in units of burst sizes provided by the burst size control unit until all the data are transmitted to the data destination.

8. A voice over Internet protocol (VoIP) phone system comprising:

a voice output unit comprising an output storage medium, the voice output unit requesting a DMAC operation for receiving voice data when the output storage medium is ready for outputting voice data and outputting the received voice data;

a memory storing the voice data;

a direct memory access control apparatus storing the voice data received from the memory in response to the direct memory access controller (DMAC) operation request of the voice output unit, successively outputting the voice data to the voice output unit in units of burst sizes until all the voice data are transmitted to the voice output unit while varying the burst size according to an available storage size of the output storage medium of the voice output unit, and generating an interrupt signal when all the voice data are transmitted to the voice output unit; and a processor processing the interrupt signal generated by the direct memory access control apparatus prior to others according to an interrupt handling routine to clear the interrupt signal, wherein the direct memory access control apparatus comprises:

a burst size control unit providing an initial burst size when a portion of the voice data is first transmitted to the voice output unit in a DMAC operation, and a reset burst size determined according to the state of the output storage medium of the voice output unit when another portion of the voice data is transmitted to the voice output unit in the DMAC operation;

a data output unit storing the voice data received from the memory, the data output unit performing a transmission operation for successively transmitting the voice data to the voice output unit in units of burst sizes provided by the burst size control unit until all the voice data are transmitted to the voice output unit;

an operation control unit controlling the data output unit to store the voice data received from the memory in response to the DMAC operation request and controlling the transmission operation of the data output unit, the operation control unit generating an interrupt signal when the transmission operation of the data output unit is completed; and a bus interface functioning as a path to the memory and the voice output unit.

9. The VoIP phone system of claim 8, wherein the operation control unit comprises:

a channel controller detecting a channel requested a DMAC operation, and setting the detected channel to be enable;

an address generator generating a source address and a destination address by checking the data source and the data destination in respect to the detected channel;

an interface signal controller encoding a control signal to be transmitted to the bus interface or decoding a signal input received from the bus interface according to a bus protocol;

a DMAC state controller determines the operational state of the apparatus;

a control signal controller storing and updating information necessary for operation of the apparatus and generating the control signal using the information; and an interrupt controller generating the interrupt signal after the data output unit performs the transmission operation until all the data are transmitted to the data destination.

10. The VoIP phone system of claim 9, wherein the interrupt controller comprises:

a transmission completion amount register storing a burst size provided by the burst size control unit as the amount of voice data transmitted to the voice output unit;

a transmission remaining amount calculator calculating the amount of remaining voice data by subtracting the amount of transmitted voice data from a total amount of the voice data;

a transmission remaining amount register storing the amount of remaining voice data calculated by the transmission remaining amount calculator; and an interrupt generation determiner generating interrupt signal generation information when the amount of remaining voice data is zero and interrupt signal non-generation information when the amount of remaining voice data is not zero.

11. The VoIP phone system of claim 8, wherein the burst size control unit comprises:
   an initial value register storing the initial burst size;
   a reset value register storing an available storage size of the output storage medium; and
   a burst size selector providing the initial burst size when a portion of voice data is first transmitted to the voice output unit in the DMAC operation and the available storage size of the output storage medium as the reset burst size when another portion of the voice data is transmitted to the voice output unit in the DMAC operation.

12. The VoIP phone system of claim 8, wherein the data output unit comprises:
   a first input first output (FIFO) storing the voice data received from the memory;
   a FIFO controller generating pointer information and a synchronization signal for the FIFO and controlling the FIFO to store the voice data transmitted from the memory in response to the DMAC operation request, the FIFO controller successively outputting the voice data stored in the FIFO in units of burst sizes provided by the burst size control unit until all the voice data are transmitted to the voice output unit.

13. A method of controlling direct memory access, the method comprising:
   reading and storing data to be transmitted in response to a direct memory access controller (DMAC) operation request by
   obtaining bus mastership in response to the DMAC operation request from the data destination,
   enabling a channel through which a DMAC operation is requested and checking a data source, the data destination, a total amount of the data to be transmitted, and the initial burst size, and
   after reading the data by accessing the data source, storing the read data in an internal storage medium;
   first-transmitting a portion of the data corresponding to an initial burst size to a data destination;
   after resetting a burst size according to a state of the data destination, second-transmitting another portion of the data corresponding to the reset burst size to the data destination;
   if all the data are not transmitted through the first-transmitting and the second-transmitting, repeating the second-transmitting until all the data are transmitted; and
   if all the data are transmitted through the first-transmitting and the second-transmitting, generating an interrupt signal.

14. An apparatus for controlling direct memory access, the apparatus comprising:
   a burst size control unit providing an initial burst size when a portion of data is first transmitted to a data destination in a direct memory access controller (DMAC) operation, and a reset burst size determined according to a state of the data destination when another portion of the data is transmitted in the DMAC operation, the burst size control unit including
   an initial value register storing the initial burst size, a reset value register storing an available storage size of the data destination, and a burst size selector providing the initial burst size when a portion of data is first transmitted to the data destination in the DMAC operation and the available storage size of the data destination as the reset burst size when another portion of the data is transmitted in the DMAC operation;
   a data output unit storing data received from a data source and performing a transmission operation for successively transmitting the data to the data destination in units of burst sizes provided by the burst size control unit until all the data are transmitted to the data destination;
   an operation control unit controlling the data output unit to store the data received from the data source in response to a DMAC operation request and controlling the transmission operation of the data output unit, the operation control unit generating an interrupt signal when the transmission operation of the data output unit is completed; and
   a bus interface functioning as a path to the data source and the data destination.

\* \* \* \* \*